Oct. 9, 1951            F. R. STEEL            2,570,879
THERMOMETER FOR FISHERMEN
Filed March 15, 1949
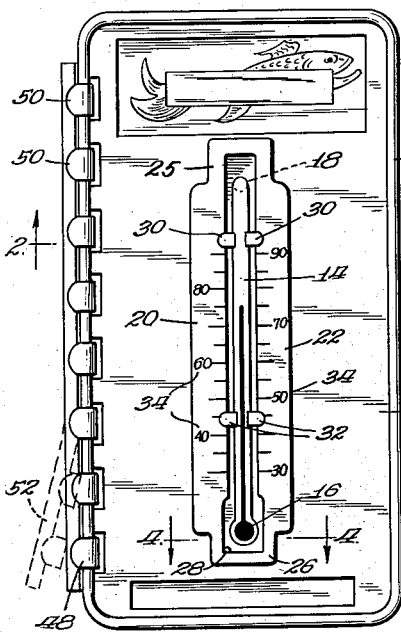
*Fig. 1.*
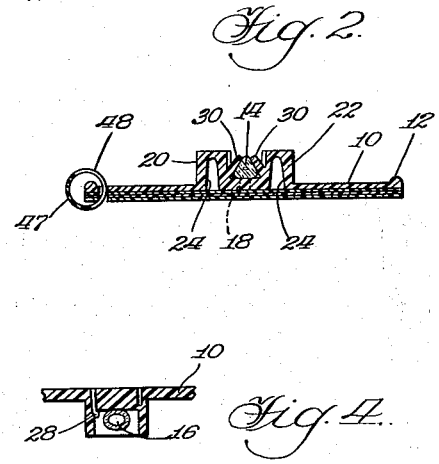
*Fig. 2.*
*Fig. 4.*
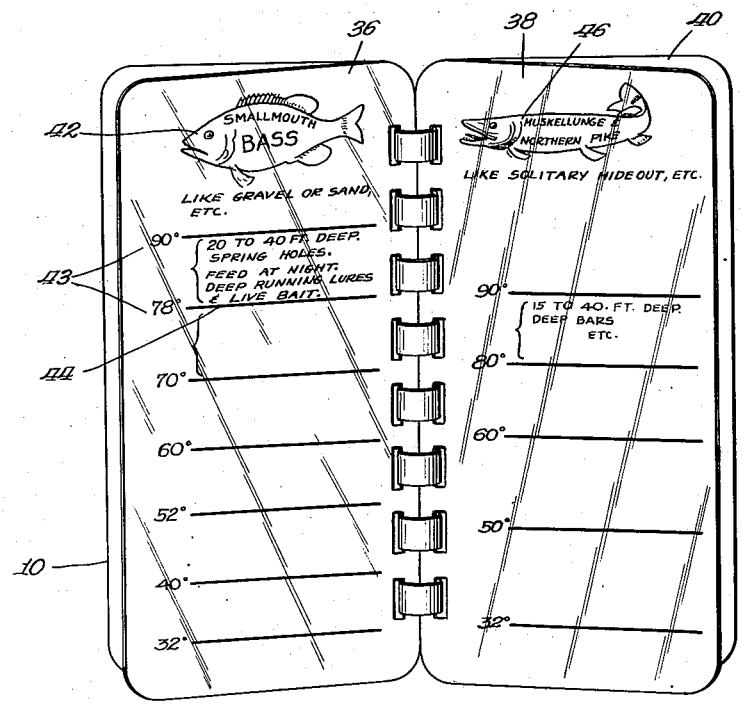
*Fig. 3.*
INVENTOR.
Frank R. Steel
BY Donald H. Sweet, Atty.

Patented Oct. 9, 1951

2,570,879

UNITED STATES PATENT OFFICE 2,570,879

THERMOMETER FOR FISHERMEN

Frank R. Steel, Wilmette, Ill.

Application March 15, 1949, Serial No. 81,578

3 Claims. (Cl. 73—343)

My invention relates to fishing and includes among its objects and advantages a particularly rugged and dependable temperature-measuring means, combined with a waterproof index of instructions for proper methods of fishing.

In the accompanying drawings,

Figure 1 is a front elevation of the fish-finder in closed condition;

Figure 2 is a section on line 2—2 of Figure 1;

Figure 3 is a perspective view of the open index; and

Figure 4 is a fragmentary section on line 4—4 of Figure 1.

In the embodiment of the invention selected for illustration, the main carrier is a plate 10 of durable water-proof plastic having a peripheral lip 12. Centrally located in front of the plate 10 is the glass thermometer 14 having a bulb 16 and filled with colored liquid. The stem of the thermometer 14 is of triangular cross section so that the filament of liquid in the stem is magnified by the glass and appears about three times as wide as it really is. In Figure 1 the width of the filament is shown as it appears, when magnified by the curvature of the glass of the stem. Registering with the upper end of the stem is a lock hole 18 in the plate 10 to receive an integral tip projecting from the stem of the thermometer. The thermometer is housed and protected by a raised portion encircling it including the side members 20 and 22 and narrower U-shaped end members 25 and 26. The relatively wide side members 20 and 22 are channel shaped, each with a central groove 24 extending in from the other side of the plate. The U-shaped portions 25 and 26 are solid but at one corner of the portion 26 adjacent the bulb 16 there is a small through hole 28 so that movement of the device through a body of water will be accompanied by a material flow into or out of the space immediately around the bulb 16.

Non-metallic water-proof means are provided for fastening the thermometer in place. I have indicated a pair of upper lugs 30 and a pair of lower lugs 32, each curving over the stem of the thermometer and holding it firmly in place. These lugs are of the same material as the side members 20 and 22 and may be formed with a gently heated metal tool by gouging material out of the side of the plastic side member to form the lug. The side members 20 and 22 have flat surfaces carrying suitable indicia indicated at 34 for convenience in reading the temperature indication, and the end members 25 and 26 extend up to the same level as the side members to provide a complete plateau above the level of the thermometer so that it is well protected against accidental breakage.

Because the entirety of the structure so far described is of water-proof plastic and equally water-proof glass, it can stand a long period of service and exposure without deterioration. Because of the configuration of the parts around the bulb 16 where nearly the entire volume of the fluid filling of the thermometer is concentrated, the thermometer has ample contact with water in which it is immersed, and responds quite rapidly with a correct indication of the temperature of such water.

The primary usefulness of such a device, to an experienced fisherman, is that the temperature of the water near the surface of a lake or stream is a fairly accurate criterion of the depth at which various types of fish prefer to stay. For the further convenience of the user, I have indicated three thin waterproof plastic blades 36, 38 and 40, which provide a six-page index. Each page of the index may be for a particular kind of fish. As indicated in Figure 3, the left hand page is for small-mouth bass, of which there is a picture at 42. Various surface water temperatures are indicated at 43 along the left hand margin, and adjacent each indicia, one set of which is indicated at 44, advising how deep the fish are likely to be when the temperature is as stated at the left hand edge and other instructions as to the feeding habits and propensities of the fish under some circumstances.

Similarly, the right hand page has a picture of a muskellunge at 46 and on the page similar instructions are given for finding muskellunge when the surface temperature of the water has been ascertained.

All three sheets 36, 38 and 40, are hingedly connected to the plate 10 as by an open free-turning hinge comprising a longitudinal arcuate beam 47 subtending an angle of about 90 degrees about the axis of the hinge and a series of arcuate fingers 48 subtending the remaining 270 degrees and having points at 50 extending beyond into notches in the edge of the beam. The hinge is made of flexible plastic material so that the individual fingers 48 can be flexed enough to unhook the hinge from the plate 10 and leaves as indicated in dotted lines at 52 in Figure 1 so that the leaves can be replaced.

All the indicia on the leaves and plate are suitably printed in and then the plate is treated to form a water-proof surface that protects the indicia from the action of water and even from a substantial amount of mechanical abrasion.

The leaves 36, 38 and 40 form a convenient hand grip by means of which the thermometer can be immersed in the water deeply enough to secure an accurate indication of the actual water temperature without plunging the user's hand into the water. A careful user gets the habit of gripping the sheets about halfway in to the hinge and lowering the device until his fingertips can feel the water. This provides an approximate gauge of the depth of immersion and contributes to accuracy.

Others may readily adapt the invention for use under various conditions of service by employing one or more of the novel features disclosed or equivalents thereof. As at present advised with respect to the apparent scope of my invention, I desire to claim the following subject matter:

1. A fisherman's thermometer comprising, in combination: a substantially flat, waterproof plastic panel about two and one-half inches wide and four and three-quarters inches long; there being a peripheral lip around the edge of said panel; said lip extending laterally away from the plane of the panel in one direction only; a central plateau including relatively wide side walls and relatively narrow U-shaped end wall portions connecting said side walls; said walls and wall portions defining a depression extending back down substantially to the panel level along the center of said plateau; a liquid-in-glass thermometer housed in said depression and located entirely below the level of said plateau; spaced pairs of lugs integral with said side walls and overlying said thermometer to hold it in place; said thermometer having a bulb at one end and a laterally projecting glass tip at the other end; said panel having a depression receiving said tip to anchor said thermometer against axial movement; said walls defining an enlargement of said depression around said bulb; said panel having a through hole communicating with said enlargement; said plateau carrying temperature indicia arranged longitudinally beside said thermometer; said wide side walls being of hollow U-shaped cross section with the bight of the U on the same side of said panel as said thermometer.

2. A fisherman's thermometer comprising, in combination: a substantially flat, waterproof plastic panel; there being a peripheral lip around the edge of said panel; a central plateau including side walls, and end walls connecting said side walls; said walls defining a depression extending back down substantially to the panel level; a liquid-in-glass thermometer housed in said depression and located entirely below the level of said pleateau; spaced pairs of lugs integral with said side walls and overlying said thermometer to hold it in place; said thermometer having a bulb at one end and a laterally projecting glass tip at the other end; said panel having a depression receiving said tip to anchor said thermometer against axial movement; said panel having a through hole communicating with said depression adjacent said bulb.

3. A fisherman's temperature indicator comprising, in combination: a base plate; a plateau formed integral with said plate; said plateau comprising channeled side walls and end walls; said walls defining an elongated recess; a temperature indicator positioned in said recess and secured therein by lugs carried by said side walls; there being a passage in said plateau establishing communication between the channeled side of said plateau and said recess; said side walls carrying temperature indicia on their top faces.

FRANK R. STEEL.

REFERENCES CITED

The following references are of record in the file of this patent:

UNITED STATES PATENTS

| Number | Name | Date |
|---|---|---|
| 110,314 | Ward | Dec. 20, 1870 |
| 645,371 | Nourse | Mar. 13, 1900 |
| 1,377,578 | Harris | May 10, 1921 |
| 1,827,778 | Bolton | Oct. 20, 1931 |
| 2,037,194 | Curtin | Apr. 14, 1936 |
| 2,313,688 | Wappner et al. | Mar. 9, 1943 |